US012719907B2

(12) United States Patent
Xu et al.

(10) Patent No.: US 12,719,907 B2
(45) Date of Patent: Aug. 25, 2026

(54) NETWORK SECURITY SITUATION AWARENESS METHOD AND APPARATUS

(71) Applicant: TSINGHUA UNIVERSITY, Beijing (CN)

(72) Inventors: Ke Xu, Beijing (CN); Yi Zhao, Beijing (CN); Yang Liu, Beijing (CN); Haibin Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 846 days.

(21) Appl. No.: 18/051,223

(22) Filed: Oct. 31, 2022

(65) Prior Publication Data

US 2023/0136375 A1 May 4, 2023

(30) Foreign Application Priority Data

Nov. 1, 2021 (CN) ......................... 202111284879.3

(51) Int. Cl.
*H04L 9/40* (2022.01)
*G06N 3/045* (2023.01)
(Continued)

(52) U.S. Cl.
CPC ......... *H04L 63/1433* (2013.01); *G06N 3/045* (2023.01); *G06N 3/0464* (2023.01); *G06N 3/048* (2023.01); *H04L 41/16* (2013.01); *H04L 63/20* (2013.01); *G06N 3/096* (2023.01); *H04L 41/145* (2013.01)

(58) Field of Classification Search
None
See application file for complete search history.

(56) References Cited

U.S. PATENT DOCUMENTS 11,663,067 B2 * 5/2023 Anghel ............... G06F 11/0709 706/21
12,242,961 B2 * 3/2025 Luo .......................... G06N 3/08
(Continued)

FOREIGN PATENT DOCUMENTS

CN 110380897 A * 10/2019 ......... H04L 63/1441
CN 110381013 A * 10/2019 ......... H04L 63/1425

*Primary Examiner* — Xuyang Xia
(74) *Attorney, Agent, or Firm* — Hodgson Russ LLP

(57) ABSTRACT

A network security situation awareness method based on collaborative learning is provided. The method includes integrating network security situation data monitored at different monitoring points in network units, and determining a unified data presentation form in each of the network units; obtaining an initial network security situation awareness model by constructing and optimizing a local network security situation awareness process; improving generalization ability of the network unit in feature extraction to meet a preset condition by using a collaborative learning framework, and obtaining a final network security situation awareness model by performing secondary fine-tuning on the personalized customization component based on the attention mechanism; performing network security situation awareness on a target network unit by using the final network security situation awareness model, and updating a training set of the final network security situation awareness model according to a network security situation awareness result.

7 Claims, 1 Drawing Sheet integrating network security situation data monitored at different monitoring points in network units, and determining a unified data presentation form in each of the network units — S101 obtaining an initial network security situation awareness model by constructing and optimizing a local network security situation awareness process according to a feature extraction module based on a convolutional neural network, a personalized customization module based on an attention mechanism and a network security situation grading module based on a fully connected network — S102 improving generalization ability of the network unit in feature extraction to meet a preset condition by using a collaborative learning framework, and obtaining a final network security situation awareness model by performing secondary fine-tuning on the personalized customization module based on the attention mechanism — S103 performing network security situation awareness on a target network unit by using the final network security situation awareness model to obtain a network security situation awareness result, and updating a training set of the final network security situation awareness model according to the network security situation awareness result — S104

(51) Int. Cl.

| | |
|---|---|
| ***G06N 3/0464*** | (2023.01) |
| ***G06N 3/048*** | (2023.01) |
| ***H04L 41/16*** | (2022.01) |
| *G06N 3/096* | (2023.01) |
| *H04L 41/14* | (2022.01) |

(56) References Cited

U.S. PATENT DOCUMENTS

2021/0192358 A1* 6/2021 Song ...................... G06N 3/044
2023/0359869 A1* 11/2023 Loic ..................... G06N 3/0455

* cited by examiner

NETWORK SECURITY SITUATION AWARENESS METHOD AND APPARATUS

CROSS-REFERENCE TO RELATED APPLICATION

This application claims priority to Chinese Patent Application No. 202111284879.3, filed on Nov. 1, 2021, the entire disclosure of which is incorporated herein by reference.

FIELD

The present disclosure relates to an internet network security technology field, and more particularly to a network security situation awareness method and a network security situation awareness apparatus.

BACKGROUND

With the development of the network technology and the enrichment of its application scenario, the computer network represented by Internet has evolved into a large-scale complex heterogeneous network including Internet of Things, autonomous and controllable private networks, industrial Internet and other forms. Thus, the security risks to the large-scale complex heterogeneous networks are also continuously developing and enriching. In order to evaluate a certain network unit (for example, a particular autonomous system, a particular unit network, or a particular form of network), the network administrator needs to deploy tasks for monitoring network status at a plurality of monitoring points (also known as network nodes), and one of the monitoring points may monitor more than one type of network security events at the same time. For a specific security event at a specific monitoring point, the network administrator may determine a threat degree caused by the specific security event according to an existing method. For example, the number of users affected by the specific security event is taken as an indication of the threat degree. However, since there are a plurality of monitoring points and a variety of different types of security events in a specific network unit, it is hard to determine an overall network security situation for the specific network unit.

For the determination of the overall network security situation of the specific network unit, a traditional method is that experts comprehensively analyze the threat degree of the security events at all monitoring points in the network unit based on their professional knowledge and the scene where the network unit is applied. However, in the traditional method, the expert's professional knowledge in the specific network unit may have some limitations, and the existing network security situation data in the specific network unit may have limitations. In practical applications, the network security situations in different network units may have similar phenomena and essence. There is a need to combine the professional knowledge and the data in different network units to improve accuracy and effectiveness of the overall network security situation awareness in the network unit.

SUMMARY

According to a first aspect of embodiments of the present disclosure, a network security situation awareness method based on collaborative learning is provided. The method includes integrating network security situation data monitored at different monitoring points in network units, and determining a unified data presentation form in each of the network units; obtaining an initial network security situation awareness model by constructing and optimizing a local network security situation awareness process according to a feature extraction module based on a convolutional neural network, a personalized customization module based on an attention mechanism and a network security situation grading module based on a fully connected network; improving generalization ability of the network unit in feature extraction to meet a preset condition by using a collaborative learning framework, and obtaining a final network security situation awareness model by performing secondary fine-tuning on the personalized customization module based on the attention mechanism; and performing network security situation awareness on a target network unit by using the final network security situation awareness model to obtain a network security situation awareness result, and updating a training set of the final network security situation awareness model according to the network security situation awareness result.

According to a second aspect of embodiments of the present disclosure, a method for determining a network security situation grade is provided. The method includes obtaining network security situation data; and obtaining the network security situation grade by inputting the network security situation data into the network security situation awareness model obtained by the network security situation awareness method in the above-mentioned embodiments.

According to a third aspect of embodiments of the present disclosure, an electronic device is provided. The electronic device includes at least one processor; and a memory communicatively connected to the at least one processor for storing computer instructions executable by the at least one processor. The at least one processor is configured to execute the computer instructions to perform the network security situation awareness method in the above-mentioned embodiments.

According to a fourth aspect of embodiments of the present disclosure, a computer-readable storage medium is provided. The computer-readable storage medium has stored therein computer instructions that, when executed by a processor, cause the processor to perform the network security situation awareness method in the above-mentioned embodiments.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
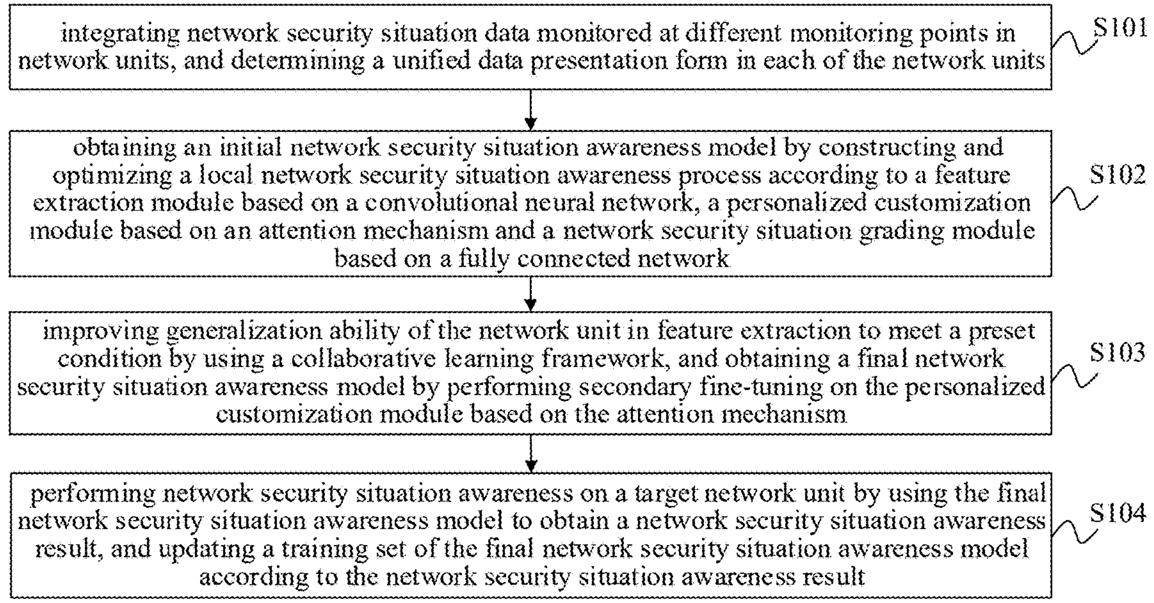
FIG. 1 is a flow chart of a network security situation awareness method based on collaborative learning in an embodiment of the present disclosure.

Embodiments of the present disclosure are described in detail below, examples of which are illustrated in the drawings. The same or similar elements and the elements having the same or similar functions are denoted by like reference numerals in different drawings unless indicated otherwise. The embodiments described herein with reference to drawings are explanatory, and used to generally understand the present disclosure, but shall not be construed to limit the present disclosure.

The present disclosure provides a network security situation awareness method and a network security situation awareness apparatus based on collaborative learning. On a premise of maintaining data privacy of the network unit, the network security situation awareness knowledge is shared in different network units, and the network unit may customize and optimize the corresponding network security situation awareness model according to customized requirements and local data. The present disclosure may effectively improve scalability of the network security situation awareness, and greatly enrich application scenario of the network security situation awareness method.

FIG. 1 is a flow chart of a network security situation awareness method based on collaborative learning in an embodiment of the present disclosure.

As shown in FIG. 1, the network security situation awareness method based on the collaborative learning includes the following steps S101 to S104.

In step S101, network security situation data monitored at different monitoring points in network units is integrated, and a unified data presentation form in each of the network units is determined.

In some embodiments, integrating the network security situation data monitored at the different monitoring points in the network units, and determining the unified data presentation form in each of the network units include collecting basic information in a complex heterogeneous network scene; determining a data presentation form by introducing random characteristics according to the basic information in the complex heterogeneous network scene; and determining as the unified data presentation form a data presentation form based on public monitoring indicators or a data presentation form based on all monitoring indicators in an ascending order of subscript indices.

Specifically, although different network units have common knowledge in monitoring network security events and the threat levels of the network security events, there are differences in the network security situation data monitored by different network units. In order to improve optimization efficiency of a deep learning model for collaborative optimization in different network units, the network security situation awareness method based on deep learning running in all network units has an identical network structure. In order to be compatible with the unified network structure, the input of the network security situation awareness method in different network units has a consistent format. Thus, the unified data presentation form is designed for the different network security situation data in the complex heterogeneous network scene by the following step 1-1 to 1-4.

In step 1-1, basic information is collected in the complex heterogeneous network scene. For example, a complex heterogeneous network includes N network units, which forms a set $U=\{U_1, U_2, \ldots, U_i, U_{i+1}, \ldots, U_{N-1}, U_N\}$, where $U_i \in U$=represents a network unit with a subscript index i. In a specific network unit $U_i \in U$=, there are $N_i$ network status monitoring nodes (i.e., network status monitoring points) for monitoring network status, which forms a set $M_i=\{M_{i,1}, M_{i,2}, \ldots, M_{i,j}, M_{i,j+1}, \ldots, M_{i,N_i-1}, M_{i,N_i}\}$, where $M_{i,j}$ represents a network status monitoring node with a subscript index j in a network unit $U_i$. In a specific network status monitoring point, there are $N_{i,j}$ monitoring indicators, which forms a set $T_{i,j}=\{T_{i,j,1}, T_{i,j,2}, \ldots, T_{i,j,k}, T_{i,j,k+1}, \ldots, T_{i,j,N_{i,j}-1}, T_{i,j,N_{i,j}}\}$.

In step 1-2, random characteristics are introduced to determine a data presentation form. An indicative variable defining the data presentation form is represented by a symbol of α. α may be valued by obtaining a current system time, converting the current time into the 24-hour standard, and determining an integer part of the minutes as a specific value of α. The network unit $U_1$ sends its own α value to other network units, such that each of the network units $U_i \in U$=keeps the same a value. When the a value is odd, the data presentation form is determined according to the following step 1-3. Otherwise, when the a value is even, the data presentation form is determined according to the following step 1-4. In addition, $$\sigma = \min\{N_i\}_{i=1}^{N}$$

represents the number of the monitoring points in the network unit with the least monitoring points. The first σ monitoring points are selected in all monitoring points in an ascending order of subscript indices, and the data of the selected monitoring points is used in the following step 1-3 or step 1-4. In step 1-3, the data presentation form is determined based on the public monitoring indicators. Elements (that is, public monitoring indicators at all network monitoring points) in an intersection set of the monitoring indicators at all network status monitoring points are selected, and are represented as a set $$A = \bigcap_{i=1}^{N}\left(\bigcap_{j=1}^{N_i}\left(\bigcap_{k=1}^{N_{i,j}} T_{i,j,k}\right)\right).$$

W represents the number of the elements in the set A, and the set A is represented as $A=\{a_1, a_2, \ldots, a_{W-1}, a_W\}$. Therefore, each of the monitoring points may obtain the monitoring indicators contained in the set A. In a specific network unit $U_i \in U$=, the values of all monitoring indicators at the first σ monitoring points are represented by a matrix $A_i$ as follows:

$$A_i = \begin{bmatrix} a_{1,1} & a_{1,2} & \cdots & a_{1,W-1} & a_{1,W} \\ a_{2,1} & a_{2,2} & \cdots & a_{2,W-1} & a_{2,W} \\ \vdots & \vdots & \ddots & \vdots & \vdots \\ a_{\sigma-1,1} & a_{\sigma-1,2} & \cdots & a_{\sigma-1,W-1} & a_{\sigma-1,W} \\ a_{\sigma,1} & a_{\sigma,2} & \cdots & a_{\sigma,W-1} & a_{\sigma,W} \end{bmatrix}$$

Elements in a row represents the public monitoring indicators monitored at the same monitoring point. The row number represents the subscript index of the monitoring point, and the column number represents the subscript index of the public monitoring indicator in the set A. Since the elements in the set A are the public monitoring indicators, each of the elements may have a corresponding monitoring value.

In step 1-4, the data presentation form is determined based on all monitoring indicators. Elements (that is, all monitoring indicators) in a union set of the monitoring indicators at all network status monitoring points are selected, and are represented by a set $$A = \bigcup_{i=1}^{N}\left(\bigcup_{j=1}^{N_i}\left(\bigcup_{k=1}^{N_{i,j}} T_{i,j,k}\right)\right).$$

W represents the number of elements of in the set A, and the set A is represented as $A=\{a_1,a_2, \ldots ,a_{W-1},a_W\}$. In a specific network unit $U_i \in U=$, the values of all monitoring indicators at the first σ monitoring points are represented by a matrix $A_t$ as follows:

$$A_i = \begin{bmatrix} a_{1,1} & a_{1,2} & \cdots & a_{1,W-1} & a_{1,W} \\ a_{2,1} & a_{2,2} & \cdots & a_{2,W-1} & a_{2,W} \\ \vdots & \vdots & \ddots & \vdots & \vdots \\ a_{\sigma-1,1} & a_{\sigma-1,2} & \cdots & a_{\sigma-1,W-1} & a_{\sigma-1,W} \\ a_{\sigma,1} & a_{\sigma,2} & \cdots & a_{\sigma,W-1} & a_{\sigma,W} \end{bmatrix}$$

Elements in a row represents the monitoring indicators monitored at the same monitoring point. The row number represents the subscript index of the monitoring point, and the column number represents the subscript index of all monitoring indicators in the set A. Since the elements in the set A include all monitoring indicators, it may not be possible to monitor the corresponding monitoring indicators at some monitoring points. At this time, a zero element is filled.

In step S102, a local network security situation awareness process is constructed and optimized according to a feature extraction module based on a convolutional neural network, a personalized customization module based on an attention mechanism and a network security situation grading module based on a fully connected network to obtain an initial network security situation awareness mode.

Specifically, the unified data presentation form in the different network security situation data in the complex heterogeneous network scene is obtained in step S101. For each of the network units $U_i \in U=$, the local network security situation awareness process is constructed and optimized by the following steps 2-1 to 2-3.

In step 2-1, the feature extraction module of the network security situation is constructed based on the convolutional neural network. The matrix A in step 1-3 or step 1-4 is determined as a local monitoring indicator matrix in the network unit $U_i \in U=$. The feature extraction is performed by using a plurality of convolution layers such as ResNet as follows:

$$\text{feature}=f_i(A_i)$$

where $f_i$ represents a feature extraction function composed of a convolution layer. Trainable parameters in the function form a set $\Phi_i$. $\text{feature}_i$ represents a matrix of h×w×c, where h, w and c represent feature parameters, respectively.

In step 2-2, the personalized customization module is constructed based on the attention mechanism. A matrix of 1×1×c is obtained by mean-pooling based on the feature $\text{feature}_i$ obtained in step 2-1. The relevant parameters of the personalized customization module are organized by using a two-layer fully connected network as follows:

$$\text{attention}_i=g_i(\text{feature}_i)$$

where $g_i$ represents a personalized customization function composed of a fully connected network. Trainable parameters in the function form a set $\Theta_i$. $\text{attention}_i$ represents a matrix of 1×1×c.

In step 2-3, the network security situation grading module is constructed based on the fully connected network. Matrix multiplication is performed based on the $\text{feature}_i$ obtained in step 2-1 and $\text{attention}_i$ obtained in step 2-2 to obtain a feature $\text{feature}_i'$ that is optimized by attention. The network security situation is graded by adopting a supervised learning approach and the two-layer fully connected network. In this stage, softmax is used as the last layer, and a loss function is cross entropy. Trainable parameters in the function form a set $\Lambda_i$. The network security situation is divided into L grades.

In step S103, generalization ability of the network unit in feature extraction is improved to meet a preset condition by using a collaborative learning framework, and a final network security situation awareness model is obtained by performing secondary fine-tuning on the personalized customization module based on the attention mechanism.

Specifically, since the difference between the data characteristics in the complex heterogeneous network scene is obvious, the data in different network units are different, and may also be repeated at some time in the future. Therefore, in order to improve awareness ability of the network unit to various data, especially the data that has never been encountered, the generalization ability of the network unit in network security situation awareness is improved through collaborative learning.

In some embodiments, improving the generalization ability of the network unit in the feature extraction by using the collaborative learning framework includes performing regular collaborative optimization and secondary fine-tuning in a preset duration based on generalization of feature extraction ability shared by some parameters, and secondary fine-tuning of a local personalized customization module, which is implemented by the following steps 3-1 to 3-3.

In step 3-1, the feature extraction ability shared by some parameters is generalized. Through the training in step 2-3, each of the network units $U_i \in U=$ has the network security situation awareness ability to adapt to the local data, which includes the feature extraction ability, the personalized customization and optimization ability, and network security situation grading ability. In order to improve coping ability of the network unit $U_i \in U=$ to unknown data (such as data that has not been encountered by the network unit $U_i$, but has been encountered by other network units), the generalization ability of the feature extraction is improved through parameter averaging. In some embodiments of the present disclosure, the parameters in the set $\Phi_i$ in all network units are averaged.

In step 3-2, the secondary fine-tuning is performed based on the local personalized customization module. By averaging the parameters in step 3-1, each of the network units $U_i \in U=$ has an improved feature extraction generalization ability for the network security situation awareness grading. At the same time, fine-tuning is performed on the personalized customization module composed of the set $\Theta_i$ by using the local data. That is, secondary training is performed on the model. During the second training, the parameters in the set $\Phi_i$ after averaging are frozen. The parameters in the set $\Theta_i$ and the set $\Lambda_i$ are adjusted by back propagation optimization based on gradient.

In step 3-3, the regular collaborative optimization and the secondary fine-tuning are performed. For the complex heterogeneous network scene, a coarse collaborative optimization model is adopted at a collaborative optimization time interval t. Specifically, at a time interval of t, all network units perform step 3-1 to perform the generalization on the latest feature extraction capability, and then step 3-2 is performed to adjust the relevant parameters of the personalized customization module by using the local data through the secondary fine-tuning.

In step S104, network security situation awareness is performed on a target network unit by using the final network security situation awareness model to obtain a network security situation awareness result, and a training set of the final network security situation awareness model is updated according to the network security situation awareness result.

In some embodiments, performing the network security situation awareness on the target network unit by using the final network security situation awareness model to obtain the network security situation awareness result, and updating the training set of the final network security situation awareness model according to the network security situation awareness result include performing network security situation grading on the target network unit to obtain a network security situation grade of the target network unit, updating the training set according to the network security situation grade of the target network unit, and optimizing the final network security situation awareness model by using the training set.

In some embodiments, performing the network security situation grading on the target network unit to obtain the network security situation grade of the target network unit, updating the training set according to the network security situation grade of the target network unit, and optimizing the final network security situation awareness model by using the training set include updating a local monitoring indicator matrix in real time; and performing the security situation grading according to a change in the local monitoring indicator matrix after updating, and updating the training set by using an event having a security grade greater than a preset grade.

Specifically, the network security situation awareness process constructed in step S102 and the parameters with personalized customization and optimization capability in step S103 are used for the network security situation grading in real time, and the dataset used for the supervised training is further enriched according to the specific situation, which are implemented by the following steps 4-1 to 4-3.

In step 4-1, the local monitoring indicator matrix is updated in real time. In each of the network units $U_i \in U=$, the local monitoring index matrix A constructed in step S101 is monitored and updated in real time.

In step 4-2, the security situation is graded based on the change in the monitoring indicator matrix. Once the value in the local monitoring indicator matrix A changes, the local monitoring indicator matrix $A_i$ is graded by using the network security situation awareness process constructed in step S102 and the parameters with the personalized customization optimization ability in step S103.

In step 4-3, the training dataset is enriched by using the events with outstanding security grade to further improve the coping ability of the sensitive network security situation. In a result reaching a specific security situation grade L', such as above L'=8, new samples in the result are used in the training set to adjust and optimize the model parameters through the step S103.

Through the above-mentioned description, the collaborative learning has the ability to share knowledge while maintaining the data privacy of each data owner. For each network unit, the deep learning model based on neural network is adopted to evaluate the data of threat degree of all security events in the network unit, so as to realize the overall network security situation awareness of the network unit. At an initial stage of the task, experts are required to analyze the overall network security situation based on the data for a period of time, which is used as the optimization basis for supervised learning of the deep learning model. In this way, the scalability of the network security situation awareness may be improved, and the pressure of the experts to make manual judgments may be reduced. At the same time, in order to make full use of the objective regulation reflected by the network security situation data in different network units, and break the limitations of a single network unit in data and knowledge, it is possible to share knowledge through the collaborative learning framework, which further improves the perception ability of the network security situation awareness module to the network security situation that has never been encountered under the premise of maintaining the data privacy of each network unit. In addition, although there is common knowledge in the network security situation awareness, there is unique knowledge that is only applicable to a special unit in the network security situation awareness in different network units in a large-scale complex heterogeneous network. For example, both autonomous system A and autonomous system B may monitor security event a, security event b, and security event c. However, security event a is more important to autonomous system A, while security event b is more important to autonomous system B, and security event c has no impact on the overall network security situation of the two autonomous systems. Therefore, when all network units perform the collaborative optimization through collaborative learning, the network units not only share knowledge through the consistent network structure, but also optimize the personalized customization module separately in the training stage, such that each network unit has a more suitable network security situation awareness module. In summary, the network security situation awareness method in some embodiments of the present disclosure has high accuracy, strong scalability and personalized customization optimization capability in the network security situation awareness in the large-scale complex heterogeneous network scene, which is suitable for deployment and application in the large-scale complex heterogeneous network scene with common knowledge and unique requirement or characteristics.

According to the network security situation awareness method based on the collaborative learning in some embodiments of the present disclosure, through the integration of the network security situation data monitored at different monitoring points in the network units, the unified data presentation form is determined in each of the network units, and thus a same network structure may be used for collaborative optimization on different network units. The local network security situation awareness process is constructed and optimized according to the feature extraction module based on the convolutional neural network, the personalized customization module based on the attention mechanism and the network security situation grading module based on the fully connected network. After the data presentation form in each of the network units and the network security situation awareness process are determined, the collaborative learning framework is used to improve the generalization ability of the network unit in the feature extraction, and the personalized customization module based on the attention mechanism is fine tuned. The network security situation grading is performed in each network unit, while a dataset for supervised training is further updated according to a specific situation.

The present disclosure further provides a method for determining a network security situation grade. The method includes obtaining network security situation data; and obtaining the network security situation grade by inputting the network security situation data into the network security situation awareness model obtained by the network security situation awareness method in the above-mentioned embodiments of the present disclosure.

A network security situation awareness apparatus based on collaborative learning in some embodiment of the present disclosure is described with reference to the drawings.

Figure 2:
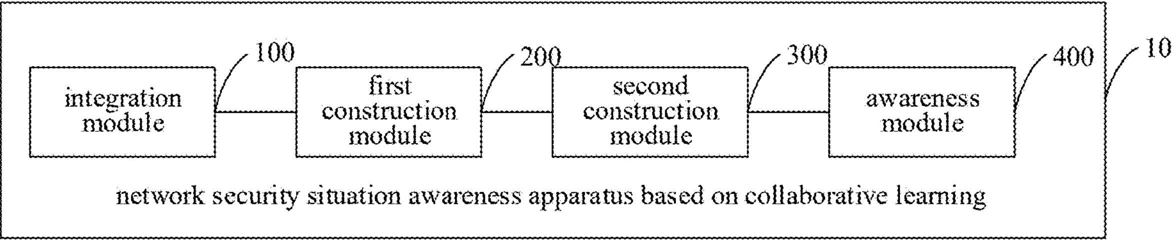
FIG. 2 is a schematic diagram showing a network security situation awareness apparatus based on collaborative learning in an embodiment of the present disclosure.

FIG. 2 is a schematic diagram showing a network security situation awareness apparatus based on collaborative learning in an embodiment of the present disclosure.

As shown in FIG. 2, the network security situation awareness apparatus 10 based on collaborative learning includes an integration module 100, a first construction module 200, a second construction module 300 and an awareness module 400.

The integration module 100 is configured to integrate network security situation data monitored at different monitoring points in network units, and determine a unified data presentation form in each of the network units. The first construction module 200 is configured to obtain an initial network security situation awareness model by constructing and optimizing a local network security situation awareness process according to a feature extraction module based on a convolutional neural network, a personalized customization module based on an attention mechanism and a network security situation grading module based on a fully connected network. The second construction module 300 is configured to improve generalization ability of the network unit in feature extraction by using a collaborative learning framework to meet a preset condition, and obtain a final network security situation awareness model by performing secondary fine-tuning on the personalized customization module based on the attention mechanism. The awareness module 400 is configured to perform network security situation awareness on a target network unit by using the final network security situation awareness model to obtain a network security situation awareness result, and update a training set of the final network security situation awareness model according to the network security situation awareness result.

In some embodiments, the awareness module 400 is further configured to perform network security situation grading on the target network unit to obtain a network security situation grade of the target network unit, update the training set according to the network security situation grade of the target network unit, and optimize the final network security situation awareness model by using the training set.

In some embodiments, the integration module 100 is configured to collect basic information in a complex heterogeneous network scene; determine a data presentation form by introducing random characteristics according to the basic information in the complex heterogeneous network scene; and determine as the unified data presentation form a data presentation form based on public monitoring indicators or a data presentation form based on all monitoring indicators in an ascending order of subscript indices.

It should be noted that the above-mentioned description of the embodiments of the network security situation awareness method based on the collaborative learning is also applicable to the network security situation awareness apparatus based on the collaborative learning, which will not be repeated here.

According to the network security situation awareness apparatus based on the collaborative learning in some embodiments of the present disclosure, through the integration of the network security situation data monitored at different monitoring points in the network units, the unified data presentation form is determined in each of the network units, and thus a same network structure may be used for collaborative optimization on different network units. The local network security situation awareness process is constructed and optimized according to the feature extraction module based on the convolutional neural network, the personalized customization module based on the attention mechanism and the network security situation grading module based on the fully connected network. After the data presentation form in each of the network units and the network security situation awareness process are determined, the collaborative learning framework is used to improve the generalization ability of the network unit in the feature extraction, and the personalized customization module based on the attention mechanism is fine tuned. The network security situation grading is performed in each network unit, while a dataset for supervised training is further updated according to a specific situation. In this way, the network security situation awareness apparatus in some embodiments of the present disclosure has high accuracy, strong scalability and personalized customization optimization capability in the network security situation awareness in the large-scale complex heterogeneous network scene, which is suitable for deployment and application in the large-scale complex heterogeneous network scene with common knowledge and unique requirement or characteristics.

Figure 3:
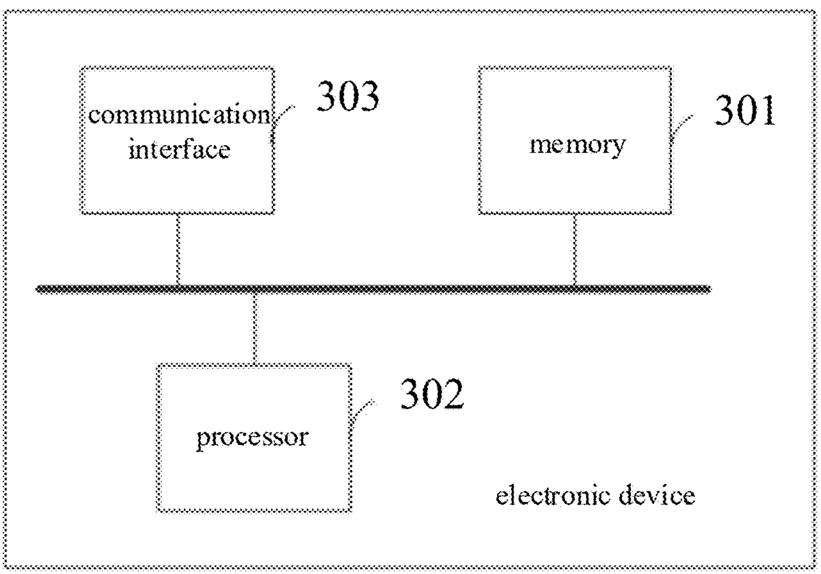
FIG. 3 is a block diagram showing an electronic device in an embodiment of the present disclosure.

FIG. 3 is a block diagram of an electronic device in an embodiment of the present disclosure. The electronic device may include a memory 301, at least one processor 302, and computer instructions stored on the memory 301 and executable by the processor 302.

The processor 302 may perform the network security situation awareness method based on the collaborative learning provided in the above-mentioned embodiments when executing the computer instructions.

Further, the electronic device further includes a communication interface 303 for communication between the memory 301 and the processor 302.

The memory 301 is configured to store the computer instructions executable by the at least one processor 302.

The memory 301 may include a high-speed RAM memory, and may also include a non-volatile memory, such as at least one disk memory.

If the memory 301, the processor 302 and the communication interface 303 are implemented independently, the communication interface 303, the memory 301 and the processor 302 may be communicatively connected to each other through a bus. The bus may be an industry standard architecture (ISA) bus, a peripheral component interconnect (PCI) bus, or an extended industry standard architecture (EISA) bus. The bus may include an address bus, a data bus, a control bus and so on. For conciseness, as shown in FIG. 3, the bus is expressed with a thick line, however it does not mean that there is only one bus or one type of bus.

In some embodiments, if the memory 301, the processor 302 and the communication interface 303 are integrated on one chip, the memory 301, the processor 302 and the communication interface 303 may be communicatively connected to each other through internal interfaces.

The processor 302 may be a central processing unit (CPU for short), or an application specific integrated circuit (ASIC for short), or one or more integrated circuits for performing the method in the above-mentioned embodiments of the present disclosure.

The present disclosure further provides a computer-readable storage medium having stored therein computer instructions that, when executed by a processor, cause the processor to perform the network security situation awareness method in the above-mentioned embodiments of the present disclosure.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in an embodiment", "in some embodiments," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, those skilled in the art may combine different embodiments or examples described in the specification and the features of different embodiments or examples without contradiction.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

It will be understood that, the flow chart or any process or method described herein in other manners may represent a module, segment, or portion of code that includes one or more executable instructions to implement the specified logic function(s) or step(s) of the process. Moreover, those skilled in the art shall understand that the scope of the preferred embodiments of the present disclosure includes other implementations, and the functions may be performed in a substantially simultaneous manner or in a reverse order according to the functions involved, rather than in the order shown or discussed.

It should be understood that each part of the present disclosure may be realized by the hardware, software, firmware or their combination. In the above-mentioned embodiments, a plurality of steps or methods may be realized by the software or firmware stored in the memory and executed by the appropriate instruction execution system. For example, if the present disclosure is realized by the hardware, likewise in another embodiment, the steps or methods may be realized by one or a combination of a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or part of the steps in the method in the above-mentioned embodiments of the present disclosure may be achieved by commanding the related hardware with the programs. The programs may be stored in a computer readable storage medium, and the programs may perform one or a combination of the steps in the method of the above-mentioned embodiments of the present disclosure when executed by a computer.

What is claimed is:

1. A network security situation awareness method based on collaborative learning, comprising:

integrating network security situation data monitored at different monitoring points in network units, and determining a unified data in each of the network units for presentation;

obtaining an initial network security situation awareness model by constructing and optimizing a local network security situation awareness process according to a feature extraction component based on a convolutional neural network, a personalized customization component based on an attention mechanism and a network security situation grading component based on a fully connected network; wherein the feature extraction component of a network security situation is constructed based on the convolutional neural network, a matrix $A_i$ is determined as a local monitoring indicator matrix in a network unit, where subscript is an integer index identifying an i-th network unit among the network units, and feature extraction is performed by using a plurality of convolution layers such as ResNet as follows:

$$\text{feature}_i = f_i(A_i)$$

wherein $f_i$ represents a feature extraction function composed of a convolution layer, trainable parameters in a function form a set $\Phi_i$, $\text{feature}_i$ represents a matrix of h×w×c, where h, w and c represent feature parameters, respectively;

the personalized customization component is constructed based on the attention mechanism, a matrix of 1×1×c is obtained by mean-pooling based on the feature $\text{feature}_i$ obtained, relevant parameters $\text{attention}_i$ of the personalized customization component are organized by using a two-layer fully connected network as follows:

$$\text{attention}_i = g_i(\text{feature}_i)$$

wherein $g_i$ represents a personalized customization function composed of the fully connected network, trainable parameters in a function form a set $\Theta_i$, and $\text{attention}_i$ represents a matrix of 1×1×c;

the network security situation grading component is constructed based on the fully connected network, matrix multiplication is performed based on the feature $\text{feature}_i$ obtained and $\text{attention}_i$ obtained to obtain a feature $\text{feature}_i'$ that is optimized by attention, the network security situation is graded by adopting a supervised learning approach and the two-layer fully connected network, softmax is used as a last layer, and a loss function is cross entropy, trainable parameters in a function form a set $\Lambda_i$, and the network security situation is divided into L grades;

improving generalization ability of the network unit in feature extraction to meet a preset condition by using a collaborative learning framework, and obtaining a final network security situation awareness model by performing secondary fine-tuning on the personalized customization component based on the attention mechanism; and performing network security situation awareness on a target network unit by using the final network security situation awareness model to obtain a network security situation awareness result, and updating a training set of the final network security situation awareness model according to the network security situation awareness result;

wherein integrating the network security situation data monitored at the different monitoring points in the network units, and determining the unified data in each of the network units for presentation comprise:

collecting basic information in a complex heterogeneous network scene;

determining a data presentation form by introducing random characteristics according to the basic information in the complex heterogeneous network scene; and determining the data presentation form based on public monitoring indicators or the data presentation form based on all monitoring indicators in an ascending order of subscript indices;

wherein the random characteristics is an integer part of minutes of a current system time in a 24-hour standard;

in a case of the integer part being odd, determining a unified data presentation form in each of the network units comprises determining as the unified data presentation form the data presentation form based on public monitoring indicators in an ascending order of subscript indices;

in a case of the integer part being even, determining the unified data presentation form in each of the network units comprises determining as the unified data presentation form the data presentation form based on all monitoring indicators in an ascending order of subscript indices;

wherein determining as the unified data presentation form the data presentation form based on the public monitoring indicators in an ascending order of subscript indices comprises:

selecting the public monitoring indicators at all network monitoring points in an intersection set of the monitoring indicators at all network status monitoring points;

forming a first set by the public monitoring indicators;

selecting values of the monitoring indicators in the first set at the first σ monitoring points in an ascending order of subscript indices;

forming a second set by the values; and determining the second set as the unified data presentation form;

wherein determining as the unified data presentation form the data presentation form based on all monitoring indicators in an ascending order of subscript indices comprises:

selecting all monitoring indicators in an union set of the monitoring indicators at all network status monitoring points;

forming a third set by the all monitoring indicators;

selecting values of the all monitoring indicators in the third set at the first σ monitoring points in an ascending order of subscript indices;

forming a fourth set by the values; and determining the fourth set as the unified data presentation form;

wherein improving the generalization ability of the network unit in the feature extraction by using the collaborative learning framework comprises:

performing regular collaborative optimization and secondary fine-tuning in a preset duration based on generalization of feature extraction ability shared by some parameters, and secondary fine-tuning of the personalized customization component;

wherein the generalization of feature extraction ability shared by some parameters comprises:

averaging parameters in the feature extraction component;

wherein performing regular collaborative optimization and secondary fine-tuning in the preset duration comprises:

performing coarse collaborative optimization on the complex heterogeneous network scene at a collaborative optimization time interval t.

2. The network security situation awareness method according to claim 1, wherein performing the network security situation awareness on the target network unit by using the final network security situation awareness model to obtain the network security situation awareness result, and updating the training set of the final network security situation awareness model according to the network security situation awareness result comprise:

performing network security situation grading on the target network unit to obtain a network security situation grade of the target network unit, updating the training set according to the network security situation grade of the target network unit, and optimizing the final network security situation awareness model by using the training set.

3. The network security situation awareness method according to claim 2, wherein performing the network security situation grading on the target network unit to obtain the network security situation grade of the target network unit, updating the training set according to the network security situation grade of the target network unit, and optimizing the final network security situation awareness model by using the training set comprise:

updating the local monitoring indicator matrix in real time; and performing the security situation grading according to a change in the local monitoring indicator matrix after updating, and updating the training set by using an event having a security grade greater than a preset grade.

4. A method for determining a network security situation grade, comprising:

obtaining network security situation data; and obtaining the network security situation grade by inputting the network security situation data into a network security situation awareness model obtained by:

integrating the network security situation data monitored at different monitoring points in network units, and determining a unified data in each of the network units for presentation;

obtaining an initial network security situation awareness model by constructing and optimizing a local network security situation awareness process according to a feature extraction component based on a convolutional neural network, a personalized customization component based on an attention mechanism and a network security situation grading component based on a fully connected network; wherein the feature extraction component of a network security situation is constructed based on the convolutional neural network, a matrix $A_i$ is determined as a local monitoring indicator matrix in a network unit, where subscript i is an integer index identifying an i-th network unit among the network units, and feature extraction is performed by using a plurality of convolution layers such as ResNet as follows:

$$\text{feature}_i = f_i(A_i)$$

wherein $f_i$ represents a feature extraction function composed of a convolution layer, trainable parameters in a function form a set $\Phi_i$, $feature_i$ represents a matrix of h×w×c, where h, w and c represent feature parameters, respectively;

the personalized customization component is constructed based on the attention mechanism, a matrix of 1×1×c is obtained by mean-pooling based on the feature $feature_i$ obtained, relevant parameters $attention_i$ of the personalized customization component are organized by using a two-layer fully connected network as follows:

$$attention_i = g_i(feature_i)$$

wherein $g_i$ represents a personalized customization function composed of the fully connected network, trainable parameters in a function form a set $\Theta_i$, and $attention_i$ represents a matrix of 1×1×c;

the network security situation grading component is constructed based on the fully connected network, matrix multiplication is performed based on the feature $feature_i$ obtained and $attention_i$ obtained to obtain a feature $feature_i'$ that is optimized by attention, the network security situation is graded by adopting a supervised learning approach and the two-layer fully connected network, softmax is used as a last layer, and a loss function is cross entropy, trainable parameters in a function form a set $\Lambda_i$, and the network security situation is divided into L grades;

improving generalization ability of the network unit in feature extraction to meet a preset condition by using a collaborative learning framework, and obtaining a final network security situation awareness model by performing secondary fine-tuning on the personalized customization component based on the attention mechanism; and performing network security situation awareness on a target network unit by using the final network security situation awareness model to obtain a network security situation awareness result, and updating a training set of the final network security situation awareness model according to the network security situation awareness result;

wherein integrating the network security situation data monitored at the different monitoring points in the network units, and determining the unified data in each of the network units for presentation comprise:

collecting basic information in a complex heterogeneous network scene;

determining a data presentation form by introducing random characteristics according to the basic information in the complex heterogeneous network scene; and determining the data presentation form based on public monitoring indicators or the data presentation form based on all monitoring indicators in an ascending order of subscript indices;

wherein the random characteristics is an integer part of minutes of a current system time in a 24-hour standard;

in a case of the integer part being odd, determining a unified data presentation form in each of the network units comprises determining as the unified data presentation form the data presentation form based on public monitoring indicators in an ascending order of subscript indices;

in a case of the integer part being even, determining the unified data presentation form in each of the network units comprises determining as the unified data presentation form the data presentation form based on all monitoring indicators in an ascending order of subscript indices;

wherein determining as the unified data presentation form the data presentation form based on the public monitoring indicators in an ascending order of subscript indices comprises:

selecting the public monitoring indicators at all network monitoring points in an intersection set of the monitoring indicators at all network status monitoring points;

forming a first set by the public monitoring indicators;

selecting values of the monitoring indicators in the first set at the first σ monitoring points in an ascending order of subscript indices;

forming a second set by the values; and determining the second set as the unified data presentation form;

wherein determining as the unified data presentation form the data presentation form based on all monitoring indicators in an ascending order of subscript indices comprises:

selecting all monitoring indicators in an union set of the monitoring indicators at all network status monitoring points;

forming a third set by the all monitoring indicators;

selecting values of the all monitoring indicators in the third set at the first σ monitoring points in an ascending order of subscript indices;

forming a fourth set by the values; and determining the fourth set as the unified data presentation form;

wherein improving the generalization ability of the network unit in the feature extraction by using the collaborative learning framework comprises:

performing regular collaborative optimization and secondary fine-tuning in a preset duration based on generalization of feature extraction ability shared by some parameters, and secondary fine-tuning of the personalized customization component;

wherein the generalization of feature extraction ability shared by some parameters comprises:

averaging parameters in the feature extraction component;

wherein performing regular collaborative optimization and secondary fine-tuning in the preset duration comprises:

performing coarse collaborative optimization on the complex heterogeneous network scene at a collaborative optimization time interval t.

5. An electronic device, comprising:

at least one processor; and a memory communicatively connected to the at least one processor for storing computer instructions executable by the at least one processor;

wherein the at least one processor is configured to execute the computer instructions to:

integrate network security situation data monitored at different monitoring points in network units, and determine a unified data in each of the network units for presentation;

obtain an initial network security situation awareness model by constructing and optimizing a local network security situation awareness process according to a feature extraction component based on a convolutional neural network, a personalized customization component based on an attention mechanism and a network security situation grading component based on a fully connected network; wherein the feature extraction component of a network security situation is constructed based on the convolutional neural network, a matrix $A_i$ is determined as a local monitoring indicator matrix in a network unit, where subscript i is an integer index identifying an i-th network unit among the network units, and feature extraction is performed by using a plurality of convolution layers such as ResNet as follows:

$$feature_i = f_i(A_i)$$

wherein $f_i$ represents a feature extraction function composed of a convolution layer, trainable parameters in a function form a set $\Phi_i$, $feature_i$ represents a matrix of h×w×c, where h, w and c represent feature parameters, respectively;

the personalized customization component is constructed based on the attention mechanism, a matrix of 1×1×c is obtained by mean-pooling based on the feature $feature_i$ obtained, relevant parameters $attention_i$ of the personalized customization component are organized by using a two-layer fully connected network as follows:

$$attention_i = g_i(feature_i)$$

wherein $g_i$ represents a personalized customization function composed of the fully connected network, trainable parameters in a function form a set $\Theta_i$, and $attention_i$ represents a matrix of 1×1×c;

the network security situation grading component is constructed based on the fully connected network, matrix multiplication is performed based on the feature $feature_i$ obtained and $attention_i$ obtained to obtain a feature $feature_i'$ that is optimized by attention, the network security situation is graded by adopting a supervised learning approach and the two-layer fully connected network, softmax is used as a last layer, and a loss function is cross entropy, trainable parameters in a function form a set $\Lambda_i$, and the network security situation is divided into L grades;

improve generalization ability of the network unit in feature extraction to meet a preset condition by using a collaborative learning framework, and obtain a final network security situation awareness model by performing secondary fine-tuning on the personalized customization component based on the attention mechanism; and perform network security situation awareness on a target network unit by using the final network security situation awareness model to obtain a network security situation awareness result, and update a training set of the final network security situation awareness model according to the network security situation awareness result;

wherein the at least one processor is further configured to:

collect basic information in a complex heterogeneous network scene;

determine a data presentation form by introducing random characteristics according to the basic information in the complex heterogeneous network scene; and determine the data presentation form based on public monitoring indicators or the data presentation form based on all monitoring indicators in an ascending order of subscript indices;

wherein the random characteristics is an integer part of minutes of a current system time in a 24-hour standard;

in a case of the integer part being odd, the at least one processor is configured to determine as a unified data presentation form the data presentation form based on public monitoring indicators in an ascending order of subscript indices;

in a case of the integer part being even, the at least one processor is configured to determine as the unified data presentation form the data presentation form based on all monitoring indicators in an ascending order of subscript indices;

wherein the at least one processor is further configured to:

select the public monitoring indicators at all network monitoring points in an intersection set of the monitoring indicators at all network status monitoring points;

form a first set by the public monitoring indicators;

select values of the monitoring indicators in the first set at the first σ monitoring points in an ascending order of subscript indices;

form a second set by the values; and determine the second set as the unified data presentation form;

wherein the at least one processor is further configured to:

select all monitoring indicators in an union set of the monitoring indicators at all network status monitoring points;

form a third set by the all monitoring indicators;

select values of the all monitoring indicators in the third set at the first σ monitoring points in an ascending order of subscript indices;

form a fourth set by the values; and determine the fourth set as the unified data presentation form;

wherein the at least one processor is further configured to:

perform regular collaborative optimization and secondary fine-tuning in a preset duration based on generalization of feature extraction ability shared by some parameters, and secondary fine-tuning of the personalized customization component;

wherein the at least one processor is further configured to:

average parameters in the feature extraction component;

wherein the at least one processor is further configured to execute the computer instructions to:

perform coarse collaborative optimization on the complex heterogeneous network scene at a collaborative optimization time interval t.

6. The electronic device according to claim 5, wherein the at least one processor is configured to:

perform network security situation grading on the target network unit to obtain a network security situation grade of the target network unit, update the training set according to the network security situation grade of the target network unit, and optimize the final network security situation awareness model by using the training set.

7. The electronic device according to claim 6, wherein the at least one processor is configured to:

update the local monitoring indicator matrix in real time; and perform the security situation grading according to a change in the local monitoring indicator matrix after updating, and update the training set by using an event having a security grade greater than a preset grade.

* * * * *